(12) United States Patent
Grayson et al.

(10) Patent No.: US 9,212,767 B2
(45) Date of Patent: Dec. 15, 2015

(54) METHOD AND APPARATUS FOR ANCHORING AN ELONGATE SUBSEA STRUCTURE TO A TERMINATION AND A FILLER MATERIAL THEREFOR

(75) Inventors: Daniel Grayson, Hartlepool (GB); Christopher Jameson, Newcastle upon Tyne (GB); Anthony Hanson, Tyne and Wear (GB)

(73) Assignee: TECHNIP FRANCE (FR)

( * ) Notice: Subject to any disclaimer, the term of this patent is extended or adjusted under 35 U.S.C. 154(b) by 552 days.

(21) Appl. No.: 12/668,116

(22) PCT Filed: Jul. 10, 2008

(86) PCT No.: PCT/GB2008/002371
§ 371 (c)(1),
(2), (4) Date: Mar. 31, 2010

(87) PCT Pub. No.: WO2009/007728
PCT Pub. Date: Jan. 15, 2009

(65) Prior Publication Data
US 2010/0196696 A1 Aug. 5, 2010

(30) Foreign Application Priority Data

Jul. 11, 2007 (GB) .................................. 0713418.2

(51) Int. Cl.
*E02D 5/54* (2006.01)
*E02D 5/74* (2006.01)
*E21B 23/01* (2006.01)
*F16L 13/11* (2006.01)
*F16L 1/26* (2006.01)

(Continued)

(52) U.S. Cl.
CPC . *F16L 13/11* (2013.01); *F16L 1/26* (2013.01); *F16L 3/22* (2013.01); *F16L 9/20* (2013.01); *Y10T 428/25* (2015.01); *Y10T 428/268* (2015.01); *Y10T 428/2982* (2015.01)

(58) Field of Classification Search
USPC ........................ 405/267, 224, 224.2, 225, 227
See application file for complete search history.

(56) References Cited

U.S. PATENT DOCUMENTS

| | | | |
|---|---|---|---|
| 1,478,214 A | 12/1923 | Gardner | |
| 3,876,579 A * | 4/1975 | Hallstrom et al. | ............ 523/220 |
| 3,999,786 A | 12/1976 | Powondra | |

(Continued)

FOREIGN PATENT DOCUMENTS

| | | |
|---|---|---|
| DE | 10 2005 008192 | 8/2006 |
| DE | 10 2005 008192 A1 | 8/2006 |

(Continued)

OTHER PUBLICATIONS

CORRIB Field Development Project Report, Aug. 2010.*

(Continued)

*Primary Examiner* — Holly Le
(74) *Attorney, Agent, or Firm* — Ostrolenk Faber LLP

(57) ABSTRACT

A method of anchoring one or more load carrying components of an elongate subsea structure, such as a flexible pipeline or umbilical, to a termination or end fitting, comprising the steps of: inserting said load carrying component(s) into or through a cavity or void within the termination; and filling said cavity or void with a filler material whereby said load carrying component(s) are embedded and anchored therein; wherein said filler material comprises spheroidal beads.

20 Claims, 2 Drawing Sheets

(51) Int. Cl.
*F16L 3/22* (2006.01)
*F16L 9/19* (2006.01)

(56) References Cited

U.S. PATENT DOCUMENTS

| | | | |
|---|---|---|---|
| 4,640,163 A | | 2/1987 | Douglas |
| 5,183,966 A | * | 2/1993 | Hurtado et al. ................. 174/20 |
| 5,959,002 A | * | 9/1999 | Kuramochi et al. .......... 523/176 |
| 6,102,077 A | | 8/2000 | Legallais et al. |
| 6,132,141 A | * | 10/2000 | Kirk ............................... 405/172 |
| 6,161,880 A | | 12/2000 | Peppel |
| 6,412,825 B1 | | 7/2002 | Langkjaer |
| 6,472,614 B1 | * | 10/2002 | Dupont et al. ............... 174/70 S |
| 6,612,369 B1 | * | 9/2003 | Rocha et al. .................. 166/363 |
| 6,696,147 B1 | * | 2/2004 | Herring et al. ................ 428/323 |
| 8,408,311 B2 | * | 4/2013 | Grayson .................... 166/242.3 |
| 8,430,311 B2 | * | 4/2013 | Ostrowski et al. ............. 235/383 |
| 2006/0185856 A1 | * | 8/2006 | Steele .................. E21B 43/103 |
| | | | 166/380 |
| 2007/0251694 A1 | * | 11/2007 | Ju et al. ......................... 166/345 |
| 2008/0014812 A1 | * | 1/2008 | Quigley et al. ................ 441/133 |
| 2010/0140930 A1 | * | 6/2010 | Grayson et al. ............... 285/335 |
| 2010/0196696 A1 | * | 8/2010 | Grayson et al. ............... 428/323 |

FOREIGN PATENT DOCUMENTS

| | | |
|---|---|---|
| GB | 2 000 567 A | 1/1979 |
| GB | 2 316 990 | 3/1998 |
| WO | WO 93/17176 | 9/1993 |
| WO | WO 2005/124213 | 12/2005 |

OTHER PUBLICATIONS

International Search Report dated Apr. 17, 2009, issued in corresponding international application No. PCT/GB2008/002371.

Notification Concerning Transmittal of International Preliminary Report on Patentability with a mailing date of Jan. 21, 2010, International Preliminary Report on Patentability, Written Opinion of the International Searching Authority issued in corresponding International Application No. PCT/GB2008/002371 (7 pages total).

* cited by examiner

METHOD AND APPARATUS FOR ANCHORING AN ELONGATE SUBSEA STRUCTURE TO A TERMINATION AND A FILLER MATERIAL THEREFOR

CROSS REFERENCE TO RELATED APPLICATIONS

The present application is a 35 U.S.C. §371 National Phase conversion of PCT/GB2008/002371, filed Jul. 10, 2008, which claims benefit of British Application No. 0713418.2, filed Jul. 11, 2007, the disclosure of which is incorporated herein by reference. The PCT International Application was published in the English language.

The present invention relates to a method and apparatus for anchoring an elongate subsea structure, such as a flexible pipeline, cable or umbilical, to a termination or end fitting, and also to an improved filler material for anchoring load carrying components of said elongate subsea structure to said termination.

BACKGROUND OF THE INVENTION

An umbilical consists of a group of one or more types of elongate active umbilical elements, such as electrical cables, optical fibre cables and fluid conveying conduits, cabled together for flexibility and over-sheathed and/or armoured for mechanical strength. Umbilicals are typically used for transmitting power, signals and fluids (for example for fluid injection, hydraulic power, gas release, etc.) to and from a subsea installation. The main fluid conduits used for manufacturing umbilical are thermoplastic hoses and steel tubes. API (American Petroleum Institute) 17E "Specification for Subsea Umbilicals", third edition, July 2003, provides standards for the design and manufacture of such umbilicals.

A steel tube umbilical is defined as an umbilical wherein all or most of the elongated umbilical elements which compose the umbilical are steel tubes. The steel tubes and the other elongated umbilical elements that make up the umbilical are grouped together and wound in a helical pattern. Examples of steel tube umbilical are disclosed in the documents U.S. Pat. No. 6,472,614, WO93/17176 and GB2316990. Steel tubes are not permeable to gases. They are also able to resist installation and in-service axial loads, and high external collapse pressures; therefore the umbilical, with judicious design, is able to withstand axial loads without requiring the addition of tensile armour layers. It is also possible to increase further its axial resistance by adding internal steel or composite rods inside the bundle (for example see U.S. Pat. No. 6,472,614 and WO2005/124213).

Flexible pipelines are used in the offshore industry for transporting, over long distances, a fluid that is under pressure and possibly at a high temperature, such as gas, oil, water or other fluids. Such flexible pipes generally comply with the standard: API 17J "Specification For Unbonded Flexible Pipe", second edition, November 1999. The unbonded pipe construction consists of separate unbonded polymeric and metallic layers, which allows relative movement between layers.

U.S. Pat. No. 6,102,077 discloses an elongated subsea structure combining the functions of a flexible pipe and of an umbilical. This structure comprises a large diameter central flexible pipe being used as a production line for conveying oil or gas, and a plurality of small diameter peripheral pipes arrayed in helical or S/Z manner around the central flexible pipe, said peripheral pipes being used as service or control lines for fluid injection, gas lift injection, hydraulic power or gas release. Such structures are marketed by the Applicant under the Registered Trademark ISU® ("Integrated Subsea Umbilical") and the identifier IPB ("Integrated Production Bundle").

The invention aims at solving the problem of joining the axial load carrying components of the elongate structure with a termination or end fitting. The axial load carrying components can include:

The tensile armour layers for cables, flexible pipes and some umbilicals;

The steel tubes of steel tubes umbilicals, ISU® and IPB;

The steel or composite rods used to increase the axial load bearing resistance of umbilicals.

The axial tensile loads acting on the assembly of the elongated subsea structure and the termination can for many applications be very high. The joint between the axial load carrying components and the termination has to be provided with sufficient strength to withstand such great axial tensile loads acting thereon.

It is known, when the axial load carrying components are metallic, to weld such components directly to a bulkhead provided on the termination. However, the welding process is very time consuming, costly and labour intensive, and may harm polymer layers by heat from the welding, such as electrical sheathing and insulating materials around conductors.

Furthermore, this solution does not fully prevent the radial displacements of the load carrying components within the termination. To overcome that drawback, a known improvement consists in filling the termination with a hard-setting compound, such as an epoxy resin. In this application, the hard-setting compound is used to prevent straightening of the tubes i.e. to prevent radial displacement within the termination. Tensile loads are transmitted through the steel tubes to the bulkhead plate to which they are welded, thus the hard-setting compound does not have to withstand the primary axial loads.

To avoid or overcome the drawbacks of the welding solution, it is also known to modify or deform the end part of each load carrying component and then secure said end parts in a cavity within the termination filled with a hard-setting compound, such that said end parts are embedded in the hard-setting compound.

U.S. Pat. No. 6,412,825 discloses a solution for joining the tensile armour layers of a flexible pipe with an end fitting, where the tensile armour layers are made with rectangular steel wire and where the end part of each wire is twisted before being embedded in the hard-setting compound.

U.S. Pat. No. 6,161,880 discloses a second similar solution for joining tensile armour layers, where the end part of each steel wire is formed in wave shape before being embedded in the hard-setting compound.

FIG. 2 of U.S. Pat. No. 4,640,163 discloses a third similar solution for joining the tensile armour layers of an umbilical with a termination, where the end part of each steel wire is formed in hook shape before being embedded in the hard-setting compound.

However, these solutions, based on securing the load carrying components in a cavity filled with a hard-setting compound, may also overheat temperature sensitive components (such as polymer sheaths), especially for large diameter umbilicals or flexible pipes where the cavity to be filled with a hard-setting compound has a large volume, because of the exothermic curing reaction. Furthermore, difficulties in pouring large volumes of such hard-setting compound may induce defects such as air bubble entrapment, with detrimental effect on the anchoring resistance. Another drawback in the case of large volumes is shrinkage of the hard-setting compound during the curing that may induce detrimental stresses in the termination, and may reduce the hard-setting compounds ability to withstand compressive loading and allow compound and/or component movement within the termination.

SUMMARY OF THE INVENTION

The present invention aims at overcoming one or more of these aforementioned problems.

According to one aspect of the present invention, there is provided a method of anchoring one or more load carrying components of an elongate subsea structure, such as a flexible pipeline or umbilical, to a termination or end fitting, comprising the steps of:
inserting said load carrying component(s) into or through a cavity or void within the termination; and
filling said cavity or void with a filler material whereby said load carrying component(s) are embedded and anchored therein;
wherein said filler material comprises spheroidal beads.

In the present application, "spheroidal beads" should be understood as bodies having a substantially spherical shape, that may or may not be perfectly round or spherical, that may or may not have uniform sizes and shapes, and that may be solid or hollow; or any mixture or combination of same.

Preferably the method comprises simultaneously, contemporaneously or separately (as a separate step) occupying and/or filling at least some, preferably the majority if not all, of the interstitial spaces between the spheroidal beads in the cavity or void with a hard-setting compound and subsequently hardening said compound.

In one embodiment, the filler material comprises the spheroidal beads and the hard-setting compound.

The hard-setting compound may be liquid or otherwise flowable or moveable. Preferably, the hard-setting compound has a low viscosity, and is able to flow, optionally with or under pressure, to move into and/or fill and/or occupy the interstitial spaces.

The hard-setting compound may comprise one or more components, and examples include epoxy and polyester resins, as well as other hard-setting compounds having a smaller compression resistance than glass or other ceramic materials. The hard-setting compound may also include or not include one or more solids materials.

Preferably, the hard-setting compound is a curable epoxy resin which is cured after occupying the interstitial spaces. Alternatively the hard-setting compound may comprise cement or any other material having suitable mechanical properties.

Optionally, the hard-setting compound is injected into the cavity or void, for example through one or more injection ports or other openings, after location of the spheroidal beads. The hard-setting compound may be provided from one or more directions, preferably including upwardly through the cavity or void, and optionally under pressure.

The method may also comprise occupying and/or filling interstitial spaces between the spheroidal beads with an interstitial filler material, such as sand or spheroidal micro-beads.

In the present application, "spheroidal micro-beads" should be understood as bodies having a similar shape as the spheroidal beads, but with much smaller dimensions. The relative small size of the spheroidal micro-beads enables them to occupy and/or fill at least some, preferably at least the majority if not all, of the interstices between the spheroidal beads.

In another embodiment of the present invention, the filler material comprises the spheroidal beads, a hard-setting compound and the interstitial filler material.

The method may comprise the further step of shaping, forming or modifying regions of said load carrying components within said cavity or void to anchor said components within the filler material and/or to better resist tensile loading.

Preferably the spheroidal beads are of a substantially uniform diameter and shape. The spheroidal beads may have a diameter of between 0.1 mm and 11 mm, preferably between 1 mm and 5 mm. In one embodiment, the spheroidal beads have a diameter between 3.2 mm and 3.8 mm.

Preferably, the spheroidal micro-beads are of a substantially uniform diameter and shape. Preferably the spheroidal micro-beads have a diameter smaller than one tenth of the diameter of the spheroidal beads. In a first embodiment where the spheroidal beads have a diameter between 3.2 mm and 3.8 mm, the spheroidal micro-beads may typically have a diameter between 0.1 mm and 0.25 mm. In a second embodiment where the spheroidal beads have a diameter around 10 mm, the spheroidal micro-beads may have a diameter between 0.5 mm and 1 mm.

Preferably, the spheroidal beads are formed from glass or ceramic material.

Preferably, the spheroidal micro-beads are formed from glass or ceramic material.

Forms and types of glass and ceramic material able to form spheroidal beads and/or spheroidal micro-beads are known in the art.

A preferred embodiment of the present invention comprises a method of anchoring one or more load carrying components of an elongate subsea structure, such as a flexible pipeline or umbilical, to a termination or end fitting as claimed in any preceding claim, at least comprising the steps of;
inserting said load carrying component(s) into or through a cavity or void within the termination;
preparing a filler material comprising solid spheroidal beads and a hard-setting compound;
filling said cavity or void with said filler material; and
allowing said filler material to harden so as to embed and anchor said load carrying component(s).

Preferably, the method further comprises the addition of an interstitial filler material in the form of spheroidal micro-beads and/or sand, the filler material comprising the interstitial filler material, the spheroidal beads and the hard-setting compound, being prepared and mixed before being filled into the termination cavity or void.

According to a second aspect of the present invention, there is provided a filler material for anchoring one or more load carrying components of an elongate subsea structure, such as a flexible pipeline or umbilical, to a termination or end fitting, said filler material comprising a plurality of spheroidal beads.

Preferably the spheroidal beads are of a substantially uniform diameter and shape. The spheroidal beads may have a diameter of between 0.1 mm and 11 mm. Preferably the spheroidal beads have a diameter of between 2 mm and 5 mm. In one embodiment, the spheroidal beads have a diameter between 3.2 mm and 3.8 mm.

Preferably the spheroidal beads are formed from glass or ceramic material.

Preferably the filler material further comprises a hard-setting compound able to occupy and/or fill at least some, preferably at least the majority if not all, of the interstitial spaces between the spheroidal beads. The hard-setting compound may comprise an epoxy resin. The filler material may further comprise an interstitial filler material, such as sand or spheroidal micro-beads, able to fill and/or occupy the interstitial spaces between the spheroidal beads.

According to a third aspect of the present invention there is provided a termination assembly for an elongate subsea structure having a plurality of load carrying components, said termination assembly comprising an end fitting having a void or cavity into or through which said plurality of load carrying components passes, said void or cavity being filled with a filler material as defined herein to anchor said plurality of load carrying components within said cavity or void.

Preferred embodiments of the present invention will now be described, by way of example only, with reference to the accompanying drawings, in which:

DESCRIPTION OF PREFERRED EMBODIMENTS

Figure 1:
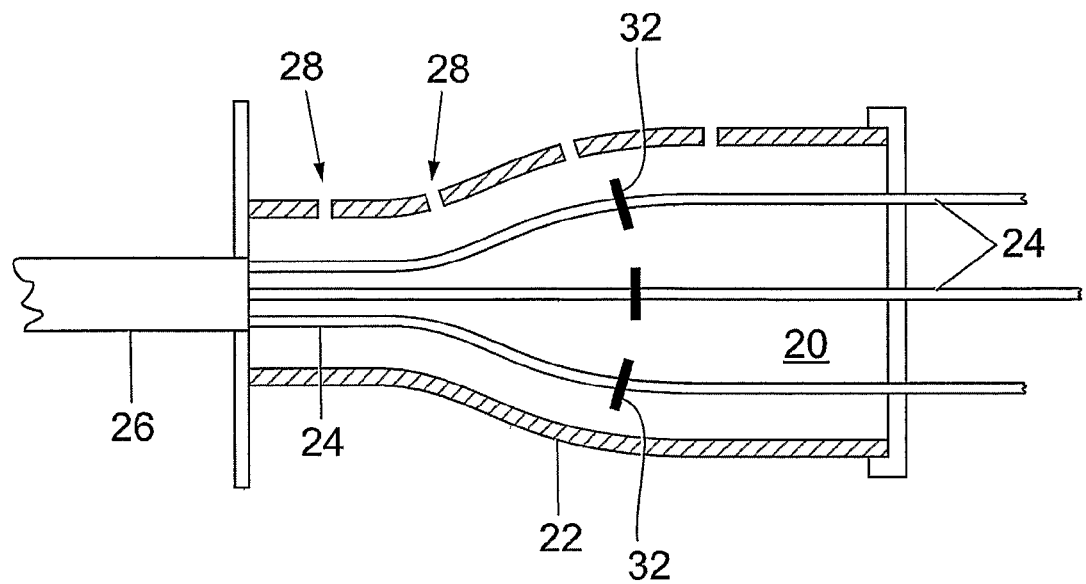
FIG. 1 is a diagrammatic cross-sectional view of a cavity of a termination with three load carrying components of a subsea structure passing therethough, ready for filling with a filler material according to one embodiment of the present invention.

Referring to the drawings, FIG. 1 is a diagrammatic cross-sectional view of a cavity 20 of a termination 22 with three load carrying components 24 of a subsea structure 26 passing therethough, ready for filling with a filler material according to embodiments of the present invention. The termination 22 may have any size, shape or design.

Figure 3:
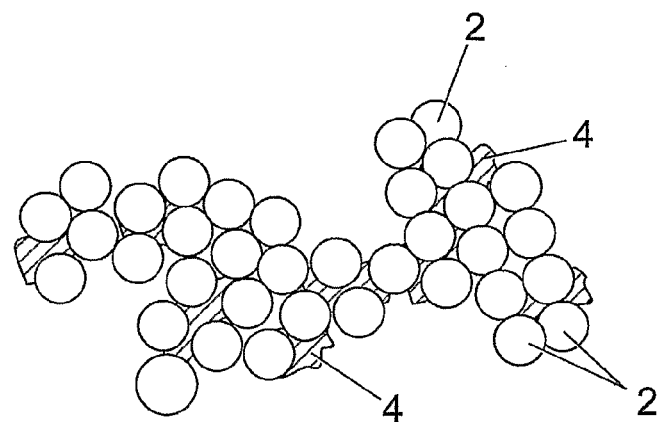
FIG. 3 is a perspective view of a filler material according to another embodiment of the present invention.

In a first embodiment of the present invention, the accomplishment of a "dry filled" umbilical end termination is achieved by introducing a dry, solid filler material, comprising for example spheroidal glass beads 2 shown in FIG. 3, having a diameter of between 3.3 mm and 3.8 mm, into the cavity 20 via a number of ports 28.

In the case of a steel tube umbilical subsea structure, not only steel tubes but also temperature sensitive components, such as electrical cables, optical fibre cables or hoses, may pass through the cavity 20. Preferably, the termination 22 is oriented horizontally and the spheroidal glass beads 2 are gravity poured through the filling ports 28 along the top of the termination 22. This ensures a high percentage of contact between the spheroidal glass beads 2 and the load bearing faces of the load carrying components 24, thus improving the anchoring and the pull-out resistance.

In this first embodiment, a hard-setting compound, for example an epoxy resin 4 in FIG. 3, is then infused through the filler material. It could be injected under low pressure, from the bottom of the termination 22, to embed and anchor said load carrying components 24 therein. A number of injection ports may be desired and/or required to prevent the development of air pockets and increase the speed of resin injection.

In another embodiment of the invention, there is provided a method of inserting said load carrying components 24 into the cavity 20, preparing a filler material comprising solid spheroidal beads 2, a hard-setting compound 4 and an interstitial filler material 30, filling said cavity 20 through the ports 28 with said filler material, and allowing the filler material to fully harden so as to embed and anchor said load carrying components 24 in the cavity 20 of the termination 22. Thus, the components of the filler material are premixed, and then allowed to flow into the cavity 20, optionally under pressure, to occupy the cavity 20. In this way, the hard-setting material 4 and the interstitial filler material 30 already occupy interstitial space between the spheroidal beads 2, and they flow to better occupy and fill interstitial spaces as the filler material flows around the load carrying components 24 in the cavity 20.

This so-termed "wet filling" method may comprise an interstitial filler material 30 in the form of spheroidal micro-beads and/or sand, the filler material, comprising said interstitial filler material 30, spheroidal beads 2 and the hard-setting compound 4, being prepared and mixed before being filled into the termination cavity 20.

Figure 2:
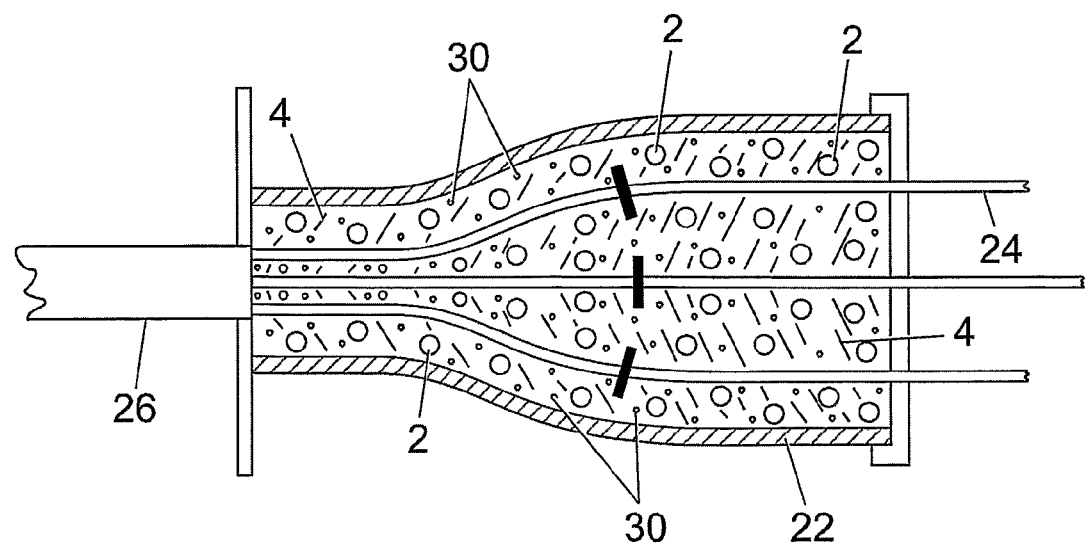
FIG. 2 is the termination of FIG. 1 once filled.

FIG. 2 shows in a representative manner only, the cavity 20 filled with an interstitial filler material 30, spheroidal beads 2 and a hard-setting compound 4 (represented with dashed lines). The number and nature of the components shown in FIG. 2 are simplified and exaggerated for the purposes of illustration of the filler material components more clearly.

The preferred characteristics of the components (such as the nature and size of the beads and micro-beads, low viscosity of the hard-setting resin) of the filler material for the "wet filling" method are similar those of the filler material corresponding to the "dry filling" method described above.

For any embodiment of the present invention, the liquid epoxy resin preferably comprises a mixture of liquid components, typically a liquid resin and a liquid hardener, without the addition of any solid filler, such as powders of corundum or quartz for example. This reduces the viscosity of the liquid resin and thus allows ease of mixing, pouring and injection of the resin. For that reason, a liquid hardener is to be preferred to a dry powdered hardener.

When formulating hard-setting compounds for filling the termination cavity, conventional methods have favoured those comprising irregular shaped fillers such as crushed minerals, corundum or quartz. The irregularity and un-polished surface finish of such fillers enable the hard-setting compound to key to the filler surface, increasing the ability of the hard-setting compound to hold the filler in position when loaded.

By contrast, the present invention provides within the termination smooth surfaced, regularly shaped spheroidal glass beads, which provide a superior consistent compaction, and which create interstitial spaces between the beads to facilitate the occupation, and/or transmission and/or diffusion, of a hard-setting compound, such as a low viscosity resin, through the beads matrix (said beads matrix being also the filler matrix in the preferred case wherein the liquid resin itself does not comprise any solid filler material).

Preferably, the filling of a termination using the present invention maximises the percentage of spheroidal beads in the overall termination cavity. This ensures better particle-to-particle (bead to bead) contact throughout the filler material, assisting dispersion of compressive loads through the glass beads matrix with minimal load transmission through the hard-setting compound.

The method of the present invention can be formulated in two configurations:
Method 1: spheroidal beads only.
Method 2: mixture of spheroidal beads with an interstitial filler material comprising spheroidal micro-beads and/or sand.

Method 1 is of benefit in colder climates, whereas Method 2 accommodates higher ambient temperatures by reducing the overall percentage by volume of hard-setting compound in the matrix. Both systems can be infused in the same manner and once cured exhibit similar mechanical properties.

The interstitial filler material used in Method 2 is of specific size to occupy and/or fit through the interstices of the spheroidal beads, whilst remaining large enough to permit hard-setting compound infusion and/or co-occupation. For example, if the diameter of the spheroidal beads is between 3.3 mm and 3.8 mm, the particle size of the interstitial filler material should preferably range between 0.15 mm and 0.25 mm. Interstitial filler material comprising particles being too small may form plugs between the glass beads, hindering or preventing infusion.

When anchoring a steel tube umbilical to a termination, the method of the present invention may use a termination of similar design to that used for current designs, with the inclusion of one or more injection ports around and/or along the termination.

In order to help anchor load carrying components, such as steel tubes, in the filler material, and to assist resisting tensile loads, one or more areas of increased localised diameter, such as via washers, hooks, sleeves or collars 32, may occur or be secured to the outer circumference of the load carrying components 24 at selected locations, possibly by welding, to define load bearing faces on the tubes. This is exemplified in WO 2008/037962 A1, incorporated herein by way of reference. Such collars 32, etc. not only assist mechanical anchoring between the load carrying components 24 and the filler material, but also reduce the amount of hard-setting compound needed, and therefore reduce any exothermic temperature occurring in the setting thereof, the benefits of which are discussed herein.

Figure 4:
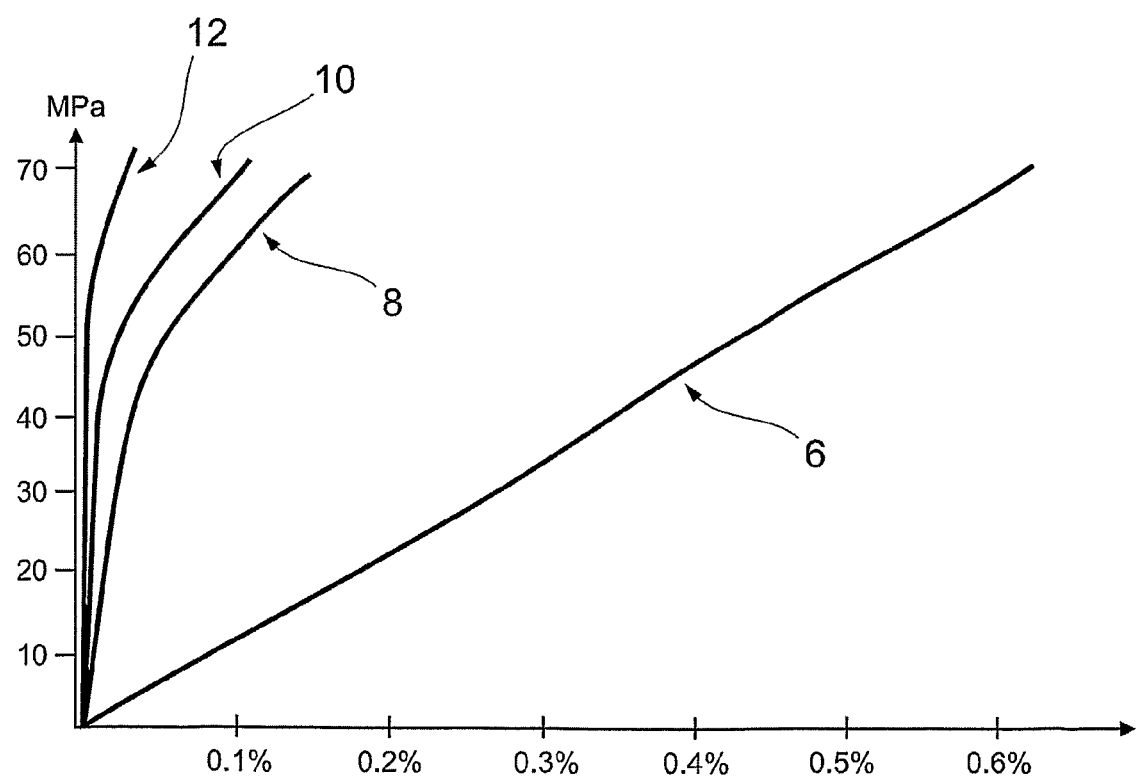
FIG. 4 is a graph of compression stress against compression strain, comparing a conventional filler material currently applied for anchoring the load carrying components of a subsea umbilical to a termination, with filler materials according to three preferred embodiments of the present invention.

Filler materials according to the present invention have shown extremely high compressive resistance (low displacement due to compressive load). FIG. 4 shows compression tests of different filler materials.

Curve 8 is an example of a compression test result of a filler material provided according to Method 1, and consisting in a mixture of spheroidal glass beads and Epoxy resin.

Curve 10 is an example of a compression test result of a filler material provided according to Method 2, and consisting in a mixture of spheroidal glass beads, Epoxy resin and spheroidal glass micro-beads.

Curve 12 is an example of a compression test result of a filler material provided according to Method 2, and consisting in a mixture of spheroidal glass beads, Epoxy resin, and sand.

Line 6 is an example of a compression test result of a filler material according to a conventional method, consisting in a mixture of finely crushed minerals and Epoxy resin.

FIG. 4 shows that the compressive moduli of elasticity of the filler materials according to embodiments of the present invention are much higher than the line 6 modulus of the filler material according to a conventional method.

The compressive modulus of elasticity of conventional filler materials, based on epoxy resins, is generally around 10 GPa. The compressive modulus of elasticity of filler materials according to embodiments of the present invention may be higher than 20 GPa. This ability to better withstand compression is due to the loads being directed predominantly through the spheroidal glass beads. The spheroidal glass beads matrix endures most compression stresses; thus the stresses applied to the Epoxy resin remain very low.

In this way, the glass beads matrix acts as a load carrying component, whereas the hard-setting compound is mainly a binding material which is not able to endure high compressive stresses. The present invention takes advantage of glass or other ceramic materials having significantly higher compressive modulus and ultimate compression strength than hard-setting compounds such as Epoxy resins. It could be possible to replace the Epoxy resin by a Polyester resin or by any other hard-setting compound having a much smaller compression resistance than glass, without departing from the present invention.

Conventional filling methods are based on introducing only a liquid filler material into a cavity within a dry termination, said liquid filler material consisting of a hard-setting resin mixed with small particles of irregular shaped crushed minerals. In such methods, the hard-setting resin has both load carrying and binding functions. To increase the load bearing capabilities of the filler material, the amount of solid crushed minerals in such resins has been increased in order to improve the compression resistance of the filler material. However, this has also increased the viscosity of the filler material to a detrimental level, significantly increasing the risk of trapping air or void bubbles and of not filling the whole cavity.

In the present invention, the replacement of small particles of crushed minerals with substantially larger glass beads has a number of significant advantages. Firstly, as discussed above, it increases the beneficial mechanical properties of the filler material. Secondly, it reduces the total volume of hard-setting resin required to fill a termination. This also reduces any exothermic reaction temperature during the polymerization of a hard-setting compound such as a resin. Thirdly, due to the geometry and the size of the beads, it makes it more favourable to use a low viscosity resin, for example an almost pure Epoxy without any solid filler, which remains easily flowable, thus reducing the degree and/or risk of not filling the whole cavity.

The addition of interstitial filler material in the form of spheroidal glass micro-beads and/or sand, i.e. Method 2 above, may also allow further reductions to the exothermic reaction temperature of the resin. Glass micro-beads for use in the present invention have a much smaller diameter than the glass beads, so that they can locate into the interstices of the beads matrix. These interstices would otherwise be solely filled with resin. For example, glass micro-beads having a diameter between 0.15 mm and 0.25 mm are preferably mixed with glass bead of diameter between 3.3 mm and 3.8 mm. Thus, the replacement of the resin with glass micro-beads further reduces the percentage, by volume, of resin in the filler material. This also reduces the cost per unit volume of the filler material. (Glass micro-beads costing less than resin, per unit volume).

Analysis of the results shown in FIG. 4 confirms that the addition of glass micro-beads (curve 10) improves the compressive modulus of elasticity of the filler material, i.e. it reduces deflection per unit of applied compressive load. This improved mechanical performance is due to the locking effect of the glass micro-beads between the larger glass beads, thus preventing movement under loaded conditions.

The filling method and filler material of the present invention preferably use a predetermined composition by weight, of spheroidal glass beads, spheroidal glass micro-beads and hard-setting resin, which, gives high mechanical performance whilst remaining practical in terms of mixing and handling.

Where the interstitial filler is in the form of high grade high purity sand in replacement of the spheroidal glass micro-beads, the filler material has similar compressive capabilities (curve 12, FIG. 4) to the filler material with glass micro-beads (curve 10, FIG. 4). Using an interstitial filler in the form of sand also provides favourable results and low costs when compared to currently used resin compounds.

Advantages of the present invention over conventional methods include:
- Reduction of the maximum exotherm (Excessive heat produced by the hard-setting resin during its chemical reaction of crosslinking), and thus reduction of the risk of damaging temperature sensitive components such as cable sheathing and insulating polymers;
- Ability to control maximum exothermic temperatures;
- Ease of mixing/pouring/injection i.e. reduced viscosity;
- Increased resin mechanical properties over a wider range of operation temperatures (including creeping reduced at high temperatures); and/or
- Reduced shrinkage of the filler material during cooling post exothermic reaction;

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiments.

What is claimed is:

1. A method of anchoring steel tubes of a subsea umbilical to a termination assembly of said subsea umbilical, the method comprising the steps of:
   inserting said steel tubes into or through a cavity within the termination; and
   filling said cavity with a hard-setting compound and a plurality of beads having substantially spherical shapes, whereby said steel tubes are embedded and anchored in said cavity;
   wherein each bead has a diameter of between 0.1 mm and 11 mm,
   wherein the beads are formed from glass or a ceramic material, and
   wherein the beads fill the cavity to form a compaction inside said cavity defined by a beads matrix in which said beads are in contact to disperse compressive loads through the beads matrix, said beads matrix defining interstitial spaces between said beads which are filled with said hard setting compound.

2. The method as claimed in claim 1, comprising occupying interstitial spaces between the beads with the hard-setting compound, and subsequently hardening said compound.

3. The method as claimed in claim 1, further comprising sand occupying interstitial spaces between the beads.

4. The method as claimed in claim 1, wherein the cavity is filled with an interstitial filler material in addition to the beads, and the hard-setting compound.

5. The method as claimed in claim 1, comprising the further step of shaping, forming or modifying regions of said steel tubes within said cavity to anchor said steel tubes within the hard-setting compound.

6. The method as claimed in claim 1, wherein the beads are of a substantially uniform diameter and shape.

7. The method as claimed in claim 1, comprising filling interstitial spaces between the beads with an interstitial filler material including micro-beads of substantially spherical shape.

8. The method as claimed in claim 1, wherein the beads have a diameter of between 3.2 mm and 3.8 mm.

9. The method as claimed in claim 1, wherein the steel tubes extend out and away from an end of the subsea umbilical into the cavity.

10. The method as claimed in claim 1, wherein the anchoring comprises the inserting and the filling steps.

11. A method of anchoring steel tubes of a subsea umbilical to a termination assembly of said subsea umbilical, the method at least comprising the steps of:
    inserting said steel tubes into or through a cavity within the termination;
    preparing a filler material comprising solid beads having substantially spherical shapes and a hard-setting compound;
    filling said cavity with said filler material; and
    allowing said filler material to harden so as to embed and anchor said steel tubes,
    wherein each bead has a diameter of between 0.1 mm and 11 mm,
    wherein the beads are formed from glass or a ceramic material, and
    wherein the beads fill the cavity to form a compaction inside said cavity defined by a beads matrix in which said beads are in contact to disperse compressive loads through the beads matrix, said beads matrix defining interstitial spaces between said beads which are filled with said hard setting compound.

12. The method as claimed in claim 11, further comprising:
    mixing an interstitial filler material in the form of spheroidal micro-beads and/or sand with the filler material, the filler material thus comprising the interstitial filler material, the beads and the hard-setting compound; and
    filling the filter material into the termination cavity.

13. The method as claimed in claim 11, wherein the steel tubes extend out and away from an end of the subsea umbilical into the cavity.

14. A termination assembly for a subsea umbilical receiving a plurality of steel tubes, said termination assembly comprising:
    an end fitting having a cavity positioned and configured to receive said plurality of steel tubes;
    filler material comprising a hard-setting compound and a plurality of beads having substantially spherical shapes and positioned and configured to anchor said plurality of steel tubes within said cavity,
    wherein each bead has a diameter of between 0.1 mm and 11 mm,
    wherein the beads are formed from glass or a ceramic material, and
    wherein the beads fill the cavity to form a compaction inside said cavity defined by a beads matrix in which said beads are in contact to disperse compressive loads through the beads matrix, said beads matrix defining interstitial spaces between said beads which are filled with said hard setting compound.

15. The termination assembly of claim 14, wherein the diameter of each bead is between 2 mm and 5 mm.

16. The termination assembly of claim 14, wherein the hard-setting compound comprises an epoxy resin.

17. The termination assembly of claim 14, further comprising an interstitial filler material occupying the interstitial spaces between the beads.

18. The termination assembly of claim 17, wherein the interstitial filler material comprises sand or spheroidal microbeads.

19. The termination assembly of claim 14, further comprising a collar secured to an outer periphery of each steel tube of said plurality of steel tubes, and positioned and configured to increase mechanical anchoring of each steel tube in the filler material.

20. The termination assembly of claim 19, wherein a length of the collar is positioned transverse to a length of each of steel tubes.

\* \* \* \* \*